United States Patent
Uemura

(10) Patent No.: US 10,715,717 B2
(45) Date of Patent: Jul. 14, 2020

(54) LENS CONTROL DEVICE, LENS CONTROL METHOD, AND RECORDING MEDIUM

(71) Applicant: CANON KABUSHIKI KAISHA, Tokyo (JP)

(72) Inventor: Hidetaka Uemura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/525,837

(22) Filed: Jul. 30, 2019

(65) Prior Publication Data
US 2019/0356843 A1    Nov. 21, 2019

Related U.S. Application Data

(62) Division of application No. 15/216,052, filed on Jul. 21, 2016, now Pat. No. 10,412,292.

(30) Foreign Application Priority Data

Jul. 29, 2015    (JP) .................................. 2015-149274

(51) Int. Cl.
| | | |
|---|---|---|
| *H04N 5/232* | (2006.01) | |
| *G03B 13/36* | (2006.01) | |
| *G03B 3/10* | (2006.01) | |

(52) U.S. Cl.
CPC ........... *H04N 5/23212* (2013.01); *G03B 3/10* (2013.01); *G03B 13/36* (2013.01); *H04N 5/23216* (2013.01)

(58) Field of Classification Search
CPC .. H04N 5/23212; H04N 5/23216; G03B 3/10; G03B 13/32; G03B 13/34; G03B 13/36
See application file for complete search history.

(56) References Cited

U.S. PATENT DOCUMENTS

| | | | |
|---|---|---|---|
| 10,412,292 | B2 * | 9/2019 | Uemura |
| 2003/0117517 | A1 | 6/2003 | Ogino |

(Continued)

FOREIGN PATENT DOCUMENTS

| | | |
|---|---|---|
| CN | 102694974 A | 9/2012 |
| CN | 103209296 A | 7/2013 |

(Continued)

OTHER PUBLICATIONS

The above U.S. Patent Application Publications #1-2 and Foreign Patent Documents # 3-4 were cited in a European Search Report dated Nov. 25, 2016, which is enclosed, that issued in the corresponding European Patent Application No. 16177933.5.

(Continued)

*Primary Examiner* — Daniel M Pasiewicz
(74) *Attorney, Agent, or Firm* — Cowan, Liebowitz & Latman, P.C.

(57) ABSTRACT

An imaging apparatus is able to perform limit control of limiting a drive range of a focus lens and performing control of the focus lens. When first information regarding an end position of the drive range of the focus lens in the limit control is set, a body control unit drives the focus lens from a position set as one end position of the drive range of the focus lens in the limit control on a near side and a far side to one end position of the movable range of the focus lens on a near side and a far side, and then stores information corresponding to a drive amount during the drive as the first information.

15 Claims, 11 Drawing Sheets

(56) References Cited

U.S. PATENT DOCUMENTS

| | | |
|---|---|---|
| 2006/0133791 A1 | 6/2006 | Miyata |
| 2008/0165272 A1 | 7/2008 | Toguchi |
| 2008/0267601 A1 | 10/2008 | Kobayashi |
| 2011/0164868 A1 | 7/2011 | Hamada |
| 2015/0373257 A1 | 12/2015 | Shirakawa |
| 2017/0099428 A1 | 4/2017 | Okuyama |
| 2017/0343768 A1 | 11/2017 | Shirai |

FOREIGN PATENT DOCUMENTS

| | | |
|---|---|---|
| CN | 103424954 A | 12/2013 |
| CN | 103827743 A | 5/2014 |
| JP | 2006-106356 A | 4/2006 |
| JP | 2006-126330 A | 5/2006 |
| JP | 2009-015147 A | 1/2009 |
| WO | 2016/072494 A1 | 5/2016 |

OTHER PUBLICATIONS

The above Foreign Patent Documents # 5-8 were cited in a Apr. 26, 2019 Chinese Office Action, which is enclosed with an English Translation, that issued in Chinese Patent Application No. 201610616363.7.

* cited by examiner

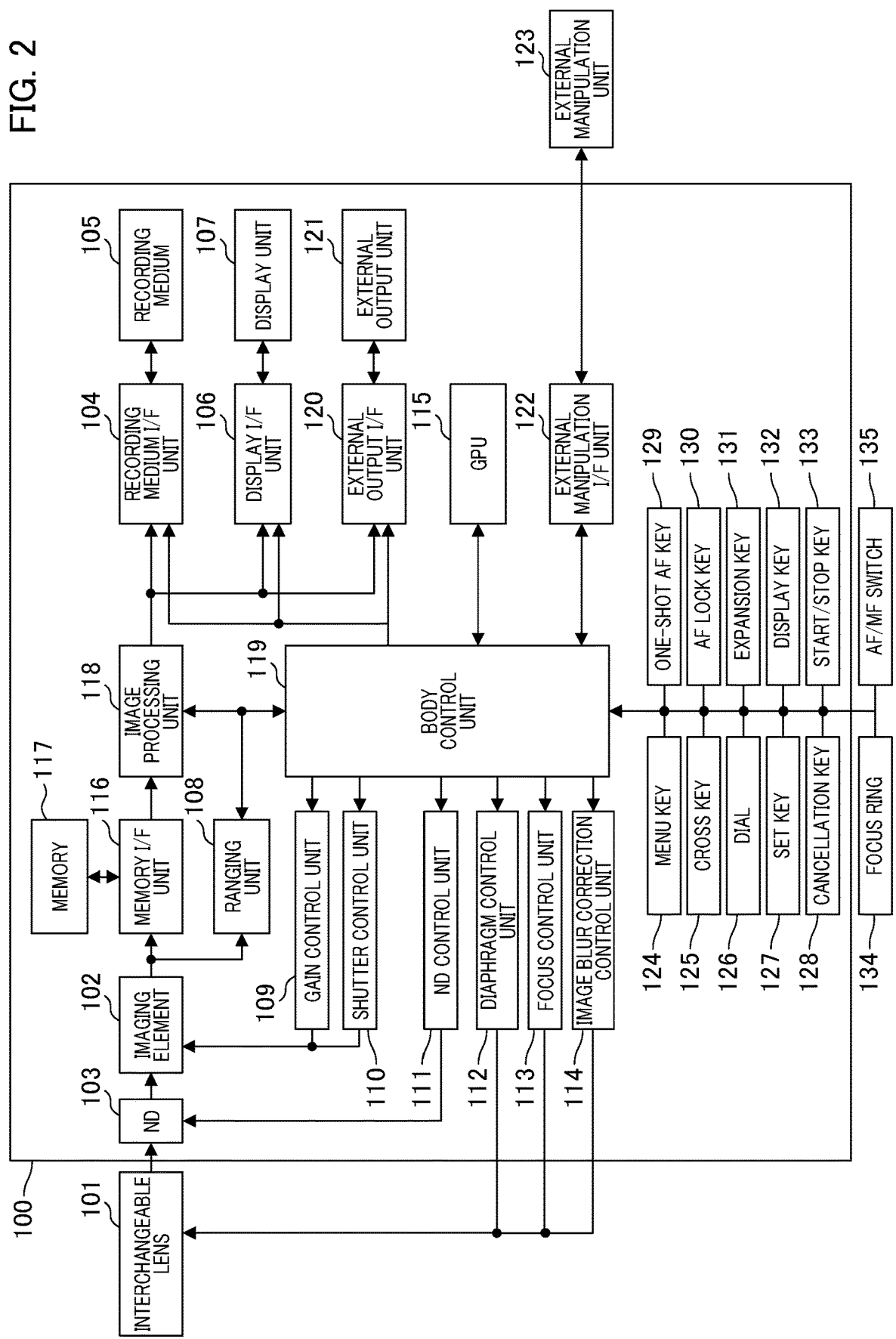

FIG. 3A

PIXEL CONFIGURATION FOR NON-IMAGE PLANE PHASE DIFFERENCE SCHEME

| Gb | B | Gb | B | Gb | B | Gb | B | Gb | B |
| R | Gr | R | Gr | R | Gr | R | Gr | R | Gr |

FIG. 3B

PIXEL CONFIGURATION FOR IMAGE PLANE PHASE DIFFERENCE SCHEME

| Gb$_A$ | B$_A$ | Gb$_A$ | B$_A$ | Gb$_A$ | B$_A$ | Gb$_A$ | B$_A$ | Gb$_A$ | B$_A$ | Gb$_A$ | B$_A$ |
| Gb$_B$ | B$_B$ | Gb$_B$ | B$_B$ | Gb$_B$ | B$_B$ | Gb$_B$ | B$_B$ | Gb$_B$ | B$_B$ | Gb$_B$ | B$_B$ |
| R$_A$ | Gr$_A$ | R$_A$ | Gr$_A$ | R$_A$ | Gr$_A$ | R$_A$ | Gr$_A$ | R$_A$ | Gr$_A$ | R$_A$ | Gr$_A$ |
| R$_B$ | Gr$_B$ | R$_B$ | Gr$_B$ | R$_B$ | Gr$_B$ | R$_B$ | Gr$_B$ | R$_B$ | Gr$_B$ | R$_B$ | Gr$_B$ |

LENS CONTROL DEVICE, LENS CONTROL METHOD, AND RECORDING MEDIUM

CROSS-REFERENCE TO RELATED APPLICATION

This application is a divisional of application Ser. No. 15/216,052, filed Jul. 21, 2016, the entire disclosure of which is hereby incorporated by reference.

BACKGROUND OF THE INVENTION

Field of the Invention

The present invention relates to a lens control device, a lens control method, and a recording medium.

Description of the Related Art

In recent years, autofocus (AF) functions of controlling focus lenses so that subjects are automatically focused in imaging apparatuses capturing still images or moving images have been invented. However, depending on imaging conditions in which autofocus functions are used, lenses may be controlled at focus positions unintended by users in some cases. For example, in platform type cameras or the like including camera cases, waste or droplets attached to glass of the camera cases may be in focus in some cases. When figure skating or the like is imaged, the audience in the back may be in focus instead of the skater in some cases.

Methods of controlling focus lenses solely in ranges in which subjects desired to be focused by users are located in the foregoing events have been proposed. In Japanese Patent Laid-Open No. 2009-15147, a switch that transitions to a mode in which a focus drivable range is set is provided and a range in which a focus lens is moved while the switch is turned on is decided as the focus drivable range. Accordingly, an imaging apparatus enabling autofocus to be performed in any focus drivable range desired by a user is disclosed.

In Japanese Patent Laid-Open No. 2006-106356, limit control is performed on an autofocus operation on a near side from a focus limit position stored and set in advance. Further, Japanese Patent Laid-Open No. 2006-106356 discloses an imaging apparatus capable of focusing a subject out of a limit range by not performing the limit control at the time of manual focus.

In the technologies of the related art, when position information regarding focus lenses can be acquired as absolute positions, control (focus limit control) can be realized such that driving ranges of the focus lenses are limited. However, in cases of lens interchangeable imaging apparatuses, position information regarding focus lenses may not be acquired as absolute positions depending on mounted lenses, and there are lenses for which the position information can be acquired only at relative positions at which some pulses are moved from current positions in lens communication. In such lenses, relative position information may not be updated and current lens positions may be unknown when focus rings are manually manipulated. An error may occur between the number of actually driven pulses and the number of pulses maintained as the relative position information whenever a focus manipulation is repeated. Further, for the relative position information, there are also lenses in which updating of position information is stopped at the time of arrival at near end or far end and lenses in which the position information continues increasing or decreasing infinitely.

In the control methods of the related art, it is difficult to perform focus limit control described above on such lenses. For this reason, lens control may be performed at focus positions unintended by users depending on imaging condition in which autofocus function is used.

SUMMARY OF THE INVENTION

According to the present invention, lens control is prevented from being performed at a lens position unintended by a user even when an absolute position of a lens may not be acquired.

According to an aspect of the present invention, a lens control device includes: a reception unit configured to receive designation of at least one end position of a drive range of a focus lens in a predetermined mode in which the drive range of the focus lens is limited; an acquisition unit configured to acquire first information regarding the end position in the predetermined mode designated via the reception unit; and a control unit configured to control drive of the focus lens in the predetermined mode based on the first information. When the end position in the predetermined mode is designated via the reception unit, the control unit drives the focus lens from the designated end position to an end position of a movable range of the focus lens and the acquisition unit acquires information corresponding to a drive amount during the drive as the first information.

Further features of the present invention will become apparent from the following description of exemplary embodiments with reference to the attached drawings.

BRIEF DESCRIPTION OF THE DRAWINGS

FIG. 2 is a block diagram illustrating the digital video camera according to the embodiment.

FIGS. 3A and 3B are diagrams illustrating a part of a light reception surface of an imaging element 102.

DESCRIPTION OF THE EMBODIMENTS

Hereinafter, an embodiment of the present invention will be described with reference to the drawings. In the embodiment, a lens interchangeable digital video camera on which a lens device (interchangeable lens) can be detachably mounted will be described. However, the present invention is not limited to the embodiment, but a single lens reflex camera, a lens integrated compact camera, a mobile phone with a camera function, or the like may be used.

Figure 1A:
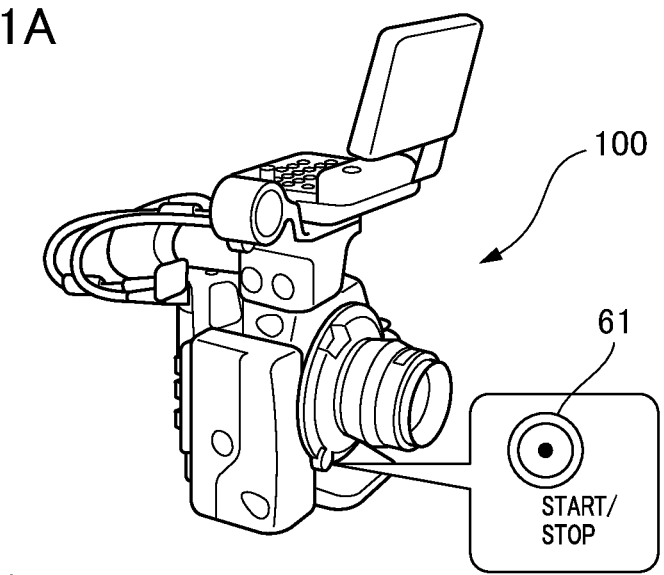
FIGS. 1A to 1C are diagrams illustrating the exterior of a digital video camera according to an embodiment.
Figure 1B:
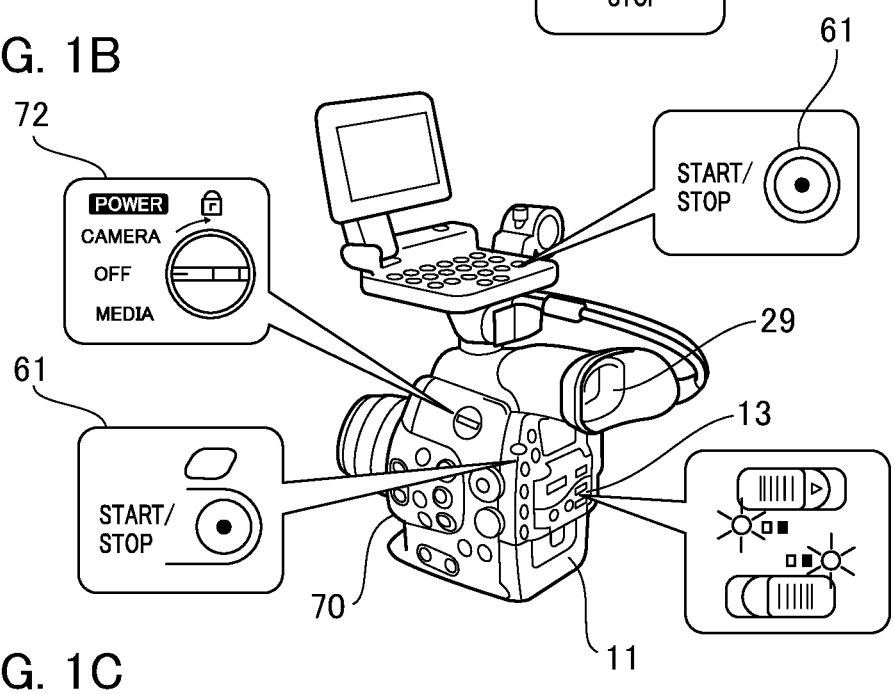
Figure 1C:
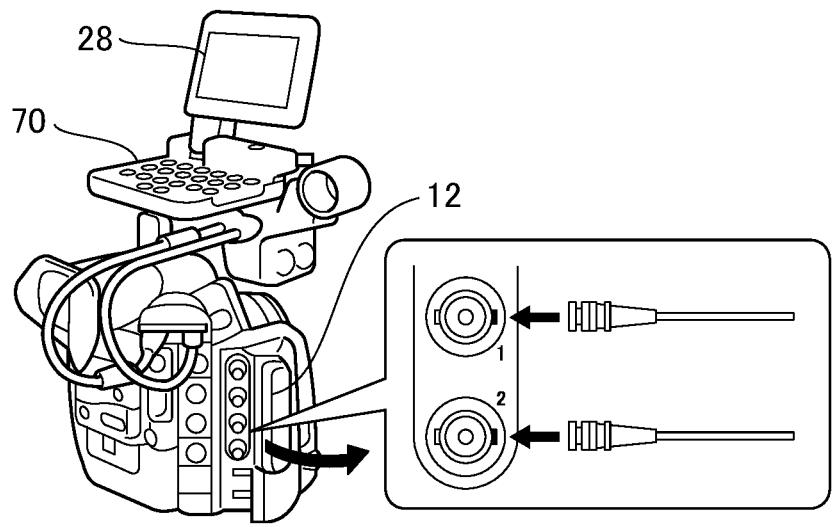

FIGS. 1A to 1C are diagrams illustrating the exterior of a digital video camera 100 which is an imaging apparatus according to the embodiment.

A monitor 28 and a finder 29 illustrated in FIGS. 1A to 1C include a display unit 107 that displays an image or various kinds of information, as illustrated in FIG. 2. A trigger button 61 is a manipulation button for giving a photographing instruction. A power/mode switch 72 is a manipulation button for turning power on or off and switching between a photographing mode and a reproduction mode. A manipulation panel 70 is formed by manipulation members such as various switches and buttons receiving various manipulations from a user. A connector 12 is a connector that outputs a video signal from the digital video camera 100 to an external monitor or an external recording apparatus and forms an external output I/F unit 120. A battery cover 11 is a cover that holds a loaded battery. An access lamp 13 is a lamp that displays a recording card slot status and is included in the display unit 107.

FIG. 2 is a block diagram illustrating an example of a functional configuration of the digital video camera 100 according to the embodiment. One or more of the functional blocks may be realized by hardware such as an ASIC or a programmable logic array (PLA) or may be realized when a programmable processor such as a CPU or an MPU executes software. Alternatively, one or more of the functional blocks may also be realized by combining software and hardware. Accordingly, in the following description, the same hardware may be realized as an entity even when different functional blocks are mentioned as operation entities.

The digital video camera 100 has an exterior structure that contains most of the functional blocks in FIG. 2. Various manipulation units, the display unit 107, and an external output unit 121 are exposed on the front surface of the digital video camera 100.

An interchangeable lens 101 is a photographing lens formed by a plurality of lens groups and includes a focus lens, a zoom lens, and a shift lens therein, in addition to a diaphragm.

An ND filter 103 is installed in the digital video camera to adjust the amount of incident light separately from the diaphragm included in the lens.

An imaging element 102 has a configuration in which a plurality of pixels including photoelectric conversion elements are arrayed 2-dimensionally. In the imaging element 102, the pixels perform photoelectric conversion on a subject optical image formed by the interchangeable lens 101, an A/D conversion circuit performs analog-to-digital conversion, and an image signal (raw image data) is output in units of pixels. The imaging element 102 used in the embodiment and a related ranging unit 108 will be described below in detail.

A memory I/F unit 116 writes raw image data corresponding to all of the pixels and output from the imaging element 102 on a memory 117, reads raw image data retained in the memory 117, and outputs the raw image data to an image processing unit 118.

The memory 117 is a volatile storage medium that stores the raw image data corresponding to all of the pixels of several frames.

The image processing unit 118 performs image processing on the raw image data corresponding to all of the pixels transmitted from the memory I/F unit 116 to correct a level difference caused in the imaging element 102. For example, not only is a level of the pixels in a valid region corrected using the pixels in an OB region, but a defected pixel is also corrected using neighboring pixels. Processes such as correction of peripheral light quantity falloff, color correction, contour enhancement, noise removal, gamma correction, debayering, and compression are performed. When the image processing unit 118 performs the foregoing processes on the raw image data input from the imaging element 102, the image processing unit 118 outputs corrected image data to another control unit.

A body control unit 119 includes a CPU, a ROM, and a RAM, and the CPU develops a program stored in the ROM in a working area of the RAM and executes the program to control operation of the entire digital video camera. The body control unit 119 executes a program stored in the ROM to realize each process to be described below according to the embodiment. The RAM develops constants and variables for operation of the body control unit 119 and a program read from the ROM. Focus limit position information stored in the RAM will be described below, but the present invention is not limited thereto. In the embodiment to be described below, the focus limit position information will be described as being stored on an imaging apparatus side. However, the focus limit position information may be stored on an interchangeable lens side.

A recording medium I/F unit 104 is an interface between a recording medium 105 and the digital video camera and controls recording of image data input from the image processing unit 118 on the recording medium 105 or reading of recorded image data.

The recording medium 105 is a recording medium formed of a semiconductor memory that records a photographed video or image data and performs recording of image data or reading of recorded image data under the control of the recording medium I/F unit 104.

A display I/F unit 106 performs superimposition combination and a resizing process on video data from the image processing unit 118 and a video RAM (VRAM) rendered by a GPU 115, and then outputs the processed data to the display unit 107. When an expansion display mode is validated by the body control unit 119, the display I/F unit 106 performs the superimposition combination and the resizing process on a partial region of the video data. As a result, in the expansion display mode, a video expanded more than at normal times is displayed on the display unit 107. Therefore, a photographer can perform an MF adjustment manipulation more accurately and easily.

The display unit 107 is a monitor or a finder that displays the image data output from the display I/F unit 106 to confirm a view angle.

The GPU 115 is a rendering engine that displays various kinds of information of a video camera or renders a menu screen in the VRAM. The GPU 115 has not only the function of rendering a text string or a figure but also an expansion or contraction rendering function, a rotation rendering function, and a layer combination function. The rendered VRAM has an alpha channel indicating transmittance, and thus can execute on-screen display on a video through the display I/F unit 106.

A gain control unit 109, a shutter control unit 110, an ND control unit 111, and a diaphragm control unit 112 to be described below are all blocks for exposure control. The body control unit 119 performs control of such control units based on a result obtained when the body control unit 119 calculates a luminance level of the image data output by the image processing unit 118 or an operation parameter set manually by the photographer.

The gain control unit 109 controls a gain of the imaging element 102.

The shutter control unit 110 controls a shutter speed of the imaging element 102.

The ND control unit 111 controls the amount of light incident on the imaging element 102 via the ND filter 103.

The diaphragm control unit 112 controls the diaphragm of the interchangeable lens 101.

The focus control unit 113 performs different operations depending on whether a focus drive status maintained by the body control unit 119 is an AF mode (autofocus) or an MF mode (manual focus).

In the MF mode, the focus control unit 113 stops control. In this case, the photographer can perform any focus adjustment by rotating a focus ring 134 embedded in the interchangeable lens 101. A manipulation of manually adjusting the position of the focus lens is not limited to a manipulation of rotating a ring-shaped member, but may be, for example, a button manipulation or a lever manipulation.

In the AF mode, the body control unit 119 calculates focus information regarding focus with reference to image data output from the image processing unit 118 and the focus control unit 113 controls an internal focus lens of the interchangeable lens 101 based on the focus information. More specifically, the focus control unit 113 performs control of the focus lens by controlling drive of a motor (for example, a stepping motor) (not illustrated) in the interchangeable lens 101. The body control unit 119 can also set an AF range in a partial region of the image data and calculate the focus information regarding the focus based on only a subject within the AF range. In the embodiment, AF is performed using a so-called contrast detection scheme of detecting the position of the focus lens at which contrast of an image is high based on an AF evaluation value generated from a high-frequency component of a photographing signal output from the imaging element 102.

The AF mode further includes two operation modes. One operation mode is a one-shot AF mode (first mode) and is a mode in which AF control is performed only when a one-shot AF key 129 is pressed and control of the focus control unit 113 is stopped after confirmation of focus success or focus failure. Specifically, an AF evaluation value is acquired while the focus lens is driven in a predetermined range (scan operation), and a lens position at which the AF evaluation value is at the peak is set as a focus position. The other operation mode is a mode (second mode) referred to as a servo AF mode or a continuous AF mode in which the AF control is repeatedly performed. Here, when the AF lock key 130 is pressed to enter an AF lock state, the control of the focus control unit 113 is stopped even in the continuous AF mode. Switching between the two modes is performed by changing setting in a menu screen. The AF operation mode is not limited to the foregoing example.

An image blur correction control unit 114 causes the body control unit 119 to calculate a motion vector with reference to the image data output from the image processing unit 118. An optical anti-vibration process of controlling the shift lens inside the interchangeable lens 101 is performed so that image blur is cancelled based on the calculated motion vector. Alternatively, the image blur correction control unit 114 performs electronic anti-vibration process of cutting an image into frames of a moving image in a direction in which image blur is cancelled.

The external output I/F unit 120 performs a resizing process on the video data from the image processing unit 118. Signal conversion appropriate for a standard of the external output unit 121 and granting of a control signal are performed and results are output to the external output unit 121.

The external output unit 121 is a terminal that outputs video data to the outside and is, for example, an SDI terminal or an HDMI terminal. A monitor display or an external recording apparatus can be connected.

An external manipulation I/F unit 122 is an interface that receives a control instruction according to an external manipulation unit 123 and gives a notification to the body control unit 119. For example, the external manipulation I/F unit 122 corresponds to an infrared remote control light-receiving unit, a wireless LAN interface, or an LANC.

The external manipulation unit 123 transmits a control instruction to the external manipulation I/F unit 122. The external manipulation unit 123 can transmit not only instructions corresponding to manipulations of units 124 to 135 embedded in the digital video camera 100 or the interchangeable lens 101 but also setting change information on the menu screen displayed on the display unit 107.

The menu key 124 to the AF/MF switch 135 are manipulation units and are formed of members such as keys (buttons) or dials, tact switches, or rings. The menu key 124 to the AF/MF switch 135 receive manipulations of a photographer and have a role of notifying the body control unit 119 of control instructions. The menu key 124 to the START/STOP key 133 are assembled in the digital video camera 100, and the focus ring 134 and the AF/MF switch 135 are assembled in the interchangeable lens 101. Some of the manipulation units can also exchange key roles or be allocated different functions through setting on the menu screen.

The menu key 124 instructs the display unit 107 to display a menu screen or instructs the display unit 107 to close a menu screen which is already open.

The cross key 125 and the dial 126 carry out an instruction to move a cursor for selecting an item on either menu screen or to move frame display of a focus in a direction desired by the photographer.

The SET key 127 carries out an instruction to select an item at which a cursor arrives on the menu screen or confirms any of various setting manipulations.

The cancellation key 128 carries out an instruction to return to an immediately previous hierarchy when a deeper hierarchy is selected on the menu screen or to cancel any of various setting manipulations.

The one-shot AF key 129 carries out an instruction to cause the focus control unit 113 to drive AF when the AF mode is one-shot AF.

The AF lock key 130 carries out an instruction to stop control by the focus control unit 113 or cancel a control stop state when the AF mode is the continuous AF.

The expansion key 131 carries out an instruction to expand a video displayed on the display unit 107 or return the video to the origin.

The DISPLAY key 132 carries out an instruction to change a Disp level maintained in the body control unit 119. Various kinds of information display on the display unit 107 are limited based on the selected Disp level, and thus more detailed information can be displayed or a video can be displayed more clearly.

The START/STOP key 133 carries out an instruction to start or stop recording by the recording medium I/F unit 104.

The focus ring 134 can perform focus adjustment by moving the focus lens in the interchangeable lens 101 when the focus drive state is the MF mode.

The AF/MF switch 135 carries out an instruction to switch the focus drive state, that is, the AF mode and the MF mode.

FIGS. 3A and 3B are diagrams illustrating a part of a light reception surface of the imaging element 102 serving as an image sensor.

In the embodiment, the AF is performed in accordance with the contrast detection scheme, as described above. However, imaging plane phase difference AF in which AF is performed in accordance with a phase difference detection scheme using a pair of signals output from the imaging element 102 may be used together.

In the imaging element 102, pixel portions which each maintain two photodiodes which are light-receiving units serving as photoelectric conversion units for one microlens are arranged in an array form in order to enable the imaging plane phase difference AF. Accordingly, the pixel portions are configured to receive light fluxes splitting exit pupils of the interchangeable lens 101.

FIG. 3A is a schematic diagram illustrating a part of the surface of an image sensor in an example of a Bayer array of red (R), blue (B), and green (Gb, Gr) as a reference.

FIG. 3B illustrates an example of the pixel portions which each maintain two photodiodes serving as photoelectric conversion units for one microlens to correspond to the array of color filters in FIG. 3A.

The image sensor having such a configuration is configured to output two phase difference detection signals (hereinafter also referred to as an image A signal and an image B signal) from each pixel portion. An image A is from a photodiode A and an image B is from a photodiode B. The image sensor is also configured to output a recording signal of imaging in which the signals of the two photodiodes are added (the image A signal+the image B signal). In the case of the added signals, a signal equivalent to an output of the image sensor in the example of the Bayer array schematically described in FIG. 3A is output.

The ranging unit 108 performs correlation calculation on two image signals using a signal output from the imaging element 102 serving as the image sensor to calculate information such as a defocus amount or various kinds of reliability.

In the embodiment, a total of three signals including an imaging signal and two phase difference detection signals are output from the imaging element 102, but the present invention is not limited to such a method. For example, an imaging signal and one between two phase difference AF image signals may be output for a total of two signals. In this case, the other signal between the two signals which are the output phase difference detection image signals is calculated using two output signals from the imaging element 102.

FIG. 3B illustrates the example in which the pixel portions which each maintain two photodiodes as the photoelectric conversion units for one microlens are arranged in the array form. Alternatively, pixel portions which each maintain three or more photodiodes serving as photoelectric conversion units for one microlens may be arranged in an array form. A plurality of pixel portions in which the opening positions of the light-receiving units are different for the microlenses may be arranged. That is, it is sufficient if the two phase difference detection signals, the image A signal and the image B signal, by which a phase difference can be detected can be obtained.

First Embodiment

Next, control of limiting a drive range of a focus lens (focus limit control) will be described. In a drivable range of the focus lens set in the focus limit control, a lens position on a near end is set as a near side focus limit position (a near side end position on the near side) and a lens position on a far side is set as a far side focus limit position (an end position on the far side) in the description. In a first embodiment, both of the near side focus limit position and the far side focus limit position (end positions of the drive range) are stored as relative positions from mechanical ends on the near side (hereinafter referred to as near ends) and the focus limit is performed based on position information regarding the relative positions in the description. Here, the mechanical ends correspond to the ends of a movable range of the focus lens.

Figure 4:
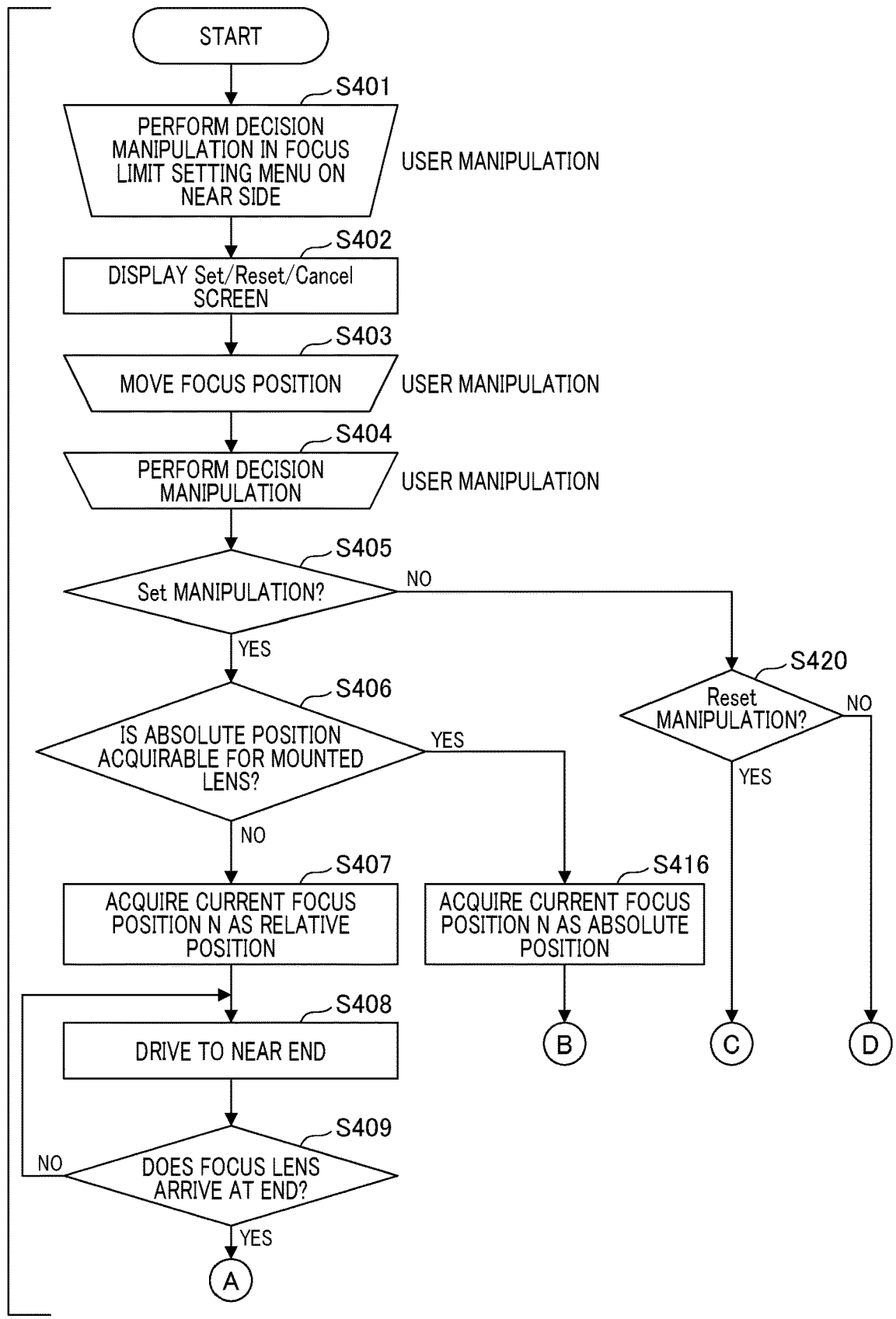
FIG. 4 is a flowchart illustrating a process of storing focus limit positions.
Figure 5:
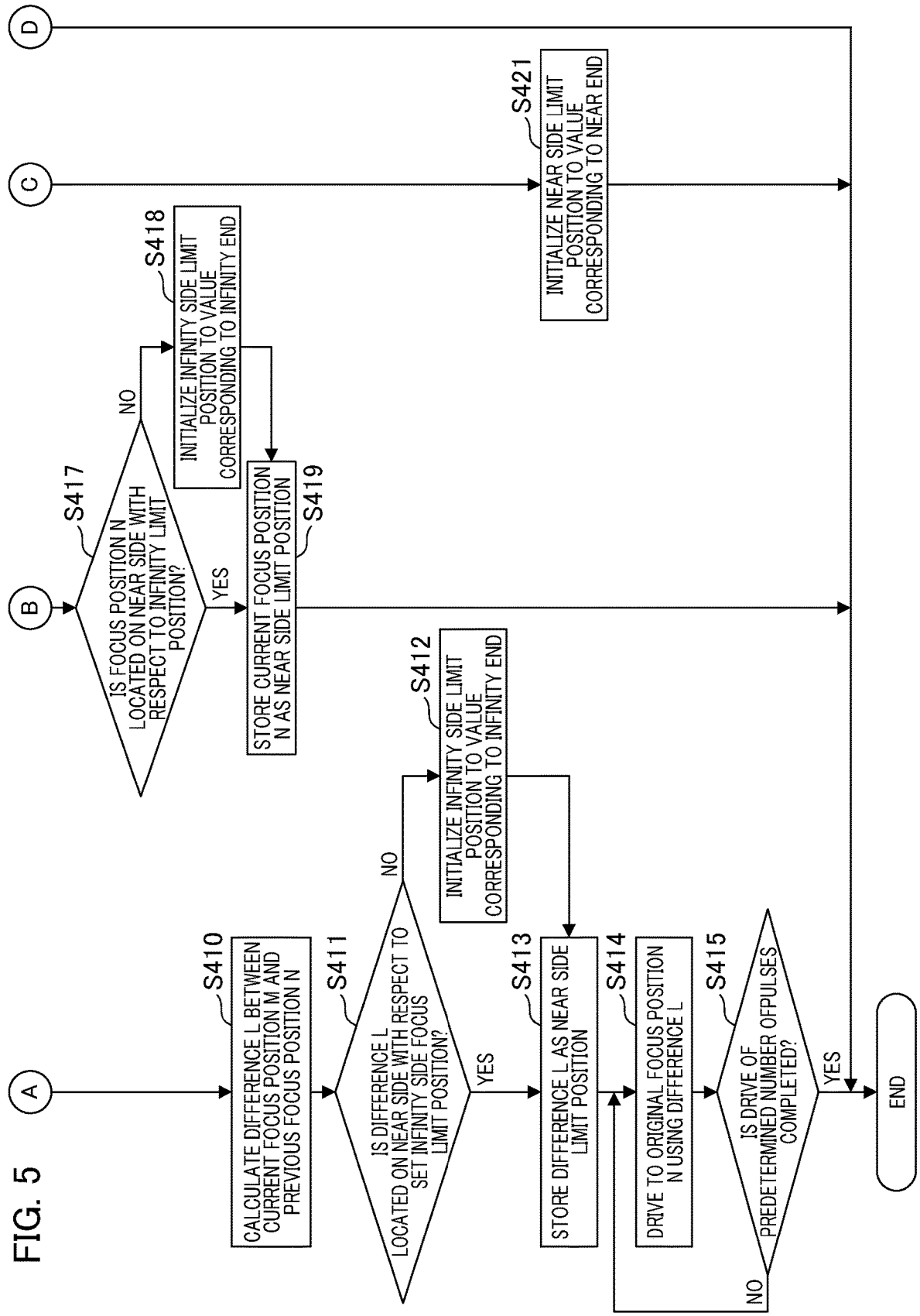
FIG. 5 is a flowchart illustrating the process of storing the focus limit positions.

FIGS. 4 and 5 are flowcharts illustrating a process of storing focus limit positions according to the first embodiment. Operations of the flowcharts are realized when the body control unit 119 controls each unit of the video digital camera based on a program stored in the ROM.

Here, a process of storing the near side focus limit position will be described. The process of storing the far side focus limit position is assumed to follow the flowcharts. In the flowcharts, a lens interchangeable type digital video camera will be assumed. As interchangeable lenses, two kinds of lenses for which position information regarding the focus lens can be acquired at an absolute position and can be acquired at a relative position are assumed to be present in the description.

In step S401, a decision manipulation is performed in a focus limit setting menu on the near side as a manipulation by a user. When the far side focus limit position is set, a decision manipulation is performed in a focus limit setting menu on the far side.

In step S402, the body control unit 119 displays a screen for 3 options, Set/Reset/Cancel, on the display unit 107 of a digital video camera body. In this state, when the user manipulates the focus ring 134, the focus lens can be driven to any position (step S403). When the focus lens is driven to a position desired to designate as the near side focus limit position by the user, the lens position is decided by selecting "Set" among 3 options displayed on the screen (Set manipulation) (step S404).

In step S405, the body control unit 119 determines whether the user manipulation performed in step S404 is the Set manipulation.

When it is determined in step S405 that content of the user manipulation in step S404 is the set manipulation, the process proceeds to step S406. In step S406, the body control unit 119 determines whether the currently mounted interchangeable lens is a lens for which the position information regarding the focus lens is acquirable at an absolute position. As a determination method, for example, information indicating whether the interchangeable lens is a lens for which the position information is acquirable at the absolute position may be acquired from the lens through communication for determination, or the determination may be performed based on identification information regarding the lens (for example, classification information regarding the lens) acquired from the lens through communication.

When it is determined in step S406 that the interchangeable lens is the lens for which the position information regarding the focus lens is not acquirable at the absolute position, that is, the lens for which the position information is acquirable at a relative position, the process proceeds to step S407. In step S407, the body control unit 119 acquires first relative position information corresponding to a current focus position N from the lens. Here, the first relative position information is information corresponding to a drive amount (in the embodiment, the number of drive pulses) from a reset position (which is obtained through a reset operation performed in advance) to the current focus position N. Hereinafter, the number of drive pulses is simply referred to as the number of pulses.

In the next step S408, the body control unit 119 performs a process of driving the focus lens to the near end after the acquisition of the first relative position information is completed.

In step S409, the body control unit 119 determines whether the focus lens reaches the near end by determining whether the focus lens arrives at an end, and continues the drive process of step S408 until the focus lens reaches the near end.

When it is determined in step S409 that the focus lens arrives at the end, that is, the focus lens reaches the near end, second relative position information corresponding to a current focus position M at the near end is acquired from the lens in the next step S410. Here, the second relative position information is information corresponding to a drive amount (in the embodiment, the number of pulses) from the reset position to the focus position M at the near end. In step S407, the body control unit 119 calculates a difference L between the first relative position information and the second relative position information. The difference L indicates a relative position of the focus position N to the near end and indicates a drive amount (in the embodiment, the number of pulses) for driving the focus lens from the near end to the focus position N. That is, the difference L indicates the near side focus limit position.

In the next step S411, the body control unit 119 determines whether the difference L calculated in step S410, that is, the near side focus limit position, is located on the near side with respect to the set far side focus limit position. This determination can be performed, for example, by comparing the relative position (the number of pulses) from the near end.

When it is determined in step S411 that the near side focus limit position is not on the near side with respect to the far side focus limit position, the process proceeds to step S412. In step S412, the body control unit 119 initializes the far side focus limit position to a value corresponding to the mechanical end on the far side (hereinafter referred to as a far end). The process proceeds to the next step S413. This is because a reverse phenomenon of the focus limit position is prevented.

When it is determined in step S411 that the near side focus limit position is located on the near side with respect to the far side focus limit position, the process proceeds to the next step S413.

In step S413, the body control unit 119 stores the difference L calculated in step S410 as information (first information) regarding the near side focus limit position. That is, information regarding the number of pulses necessary for drive from the near end to the focus position N is stored as information regarding the near side focus limit position. In the embodiment, the case in which the information regarding the number of pulses is stored has been described. However, the present invention is not limited to the case in which the number of pulses is stored. For example, a value obtained by converting the number of pulses into another unit system may be stored.

In step S414, the body control unit 119 drives the focus lens from the current focus position M, that is, the near end, to the focus position N set in steps S403 and S404 using the difference L, that is, the information regarding the relative position from the near end. In step S415, the body control unit 119 detects the number of drive pulses of the focus lens and determines whether the focus lens is driven by a predetermined number of pulses (the number of pulses corresponding to the difference L), that is, whether the focus lens reaches the original focus position N. The drive process of step S414 continues until the focus lens reaches the original focus position N. The process ends when it is determined in step S415 that driving of the predetermined number of pulses has been performed, that is, the focus lens reaches the original focus position N.

Conversely, when it is determined in step S406 that the interchangeable lens is the lens for which the position information regarding the focus lens is acquirable at the absolute position, the body control unit 119 acquires absolute position information corresponding to the current focus position N from the lens in the next step S416. Here, the absolute position information is, for example, information corresponding to a pulse position of the focus lens and information indicating the absolute position of the near side focus limit position.

In step S417, the body control unit 119 determines whether the focus position N acquired in step S416, that is, the near side focus limit position, is located on the near side with respect to the far side focus limit position. This determination can be performed by comparing the absolute position of the nearside focus limit position acquired in step S416 to the absolute position of the far side focus limit position.

When it is determined in step S417 that the near side focus limit position is not located on the near side with respect to the far side focus limit position, the process proceeds to the next step S418 in order to prevent the reverse phenomenon of the focus limit position. In step S418, the body control unit 119 initializes the far side focus limit position to a value corresponding to the far end, and then the process proceeds to the next step S419.

When it is determined in step S417 that the near side focus limit position is located on the near side with respect to the far side focus limit position, the process proceeds to the next step S419.

In step S419, the body control unit 119 stores the absolute position information of the focus position N acquired in step S416 as information regarding the near side focus limit position, and then the process ends.

Conversely, when it is determined in step S405 that content manipulated by the user in step S404 is not the Set manipulation, the process proceeds to step S420. In step S420, the body control unit 119 determines whether the content manipulated by the user in step S404 is the Reset manipulation.

When it is determined in step S420 that the content manipulated by the user in step S404 is the Reset manipulation, the process proceeds to step S421. In step S421, the body control unit 119 initializes the information regarding the near side focus limit position to a value corresponding to the near end, and then the process ends.

When it is determined in step S420 that the content manipulated by the user in step S404 is not the Reset manipulation, that is, the content is a Cancel manipulation, the process ends.

Figure 6:
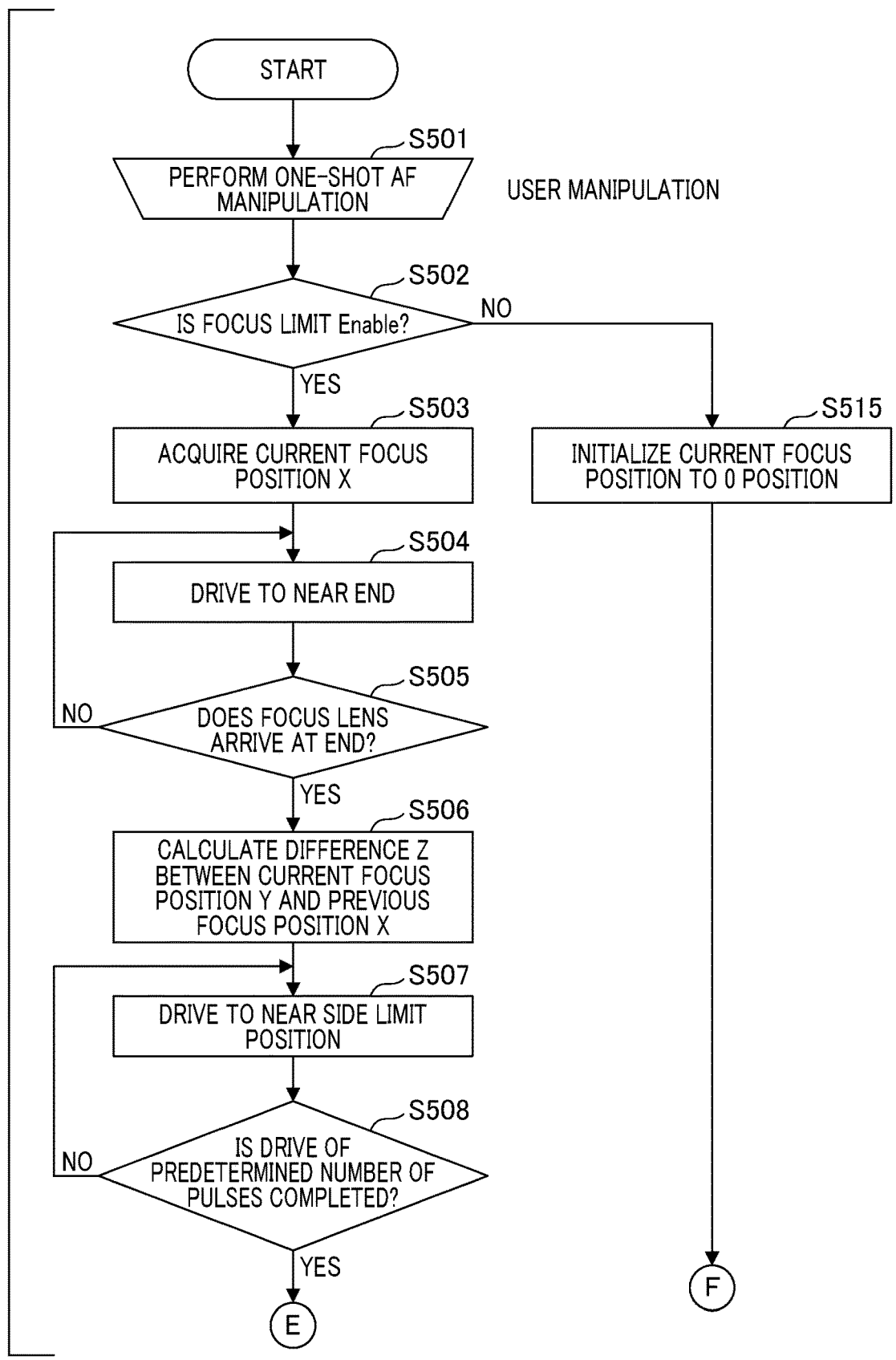
FIG. 6 is a flowchart illustrating a one-shot AF process.
Figure 7:
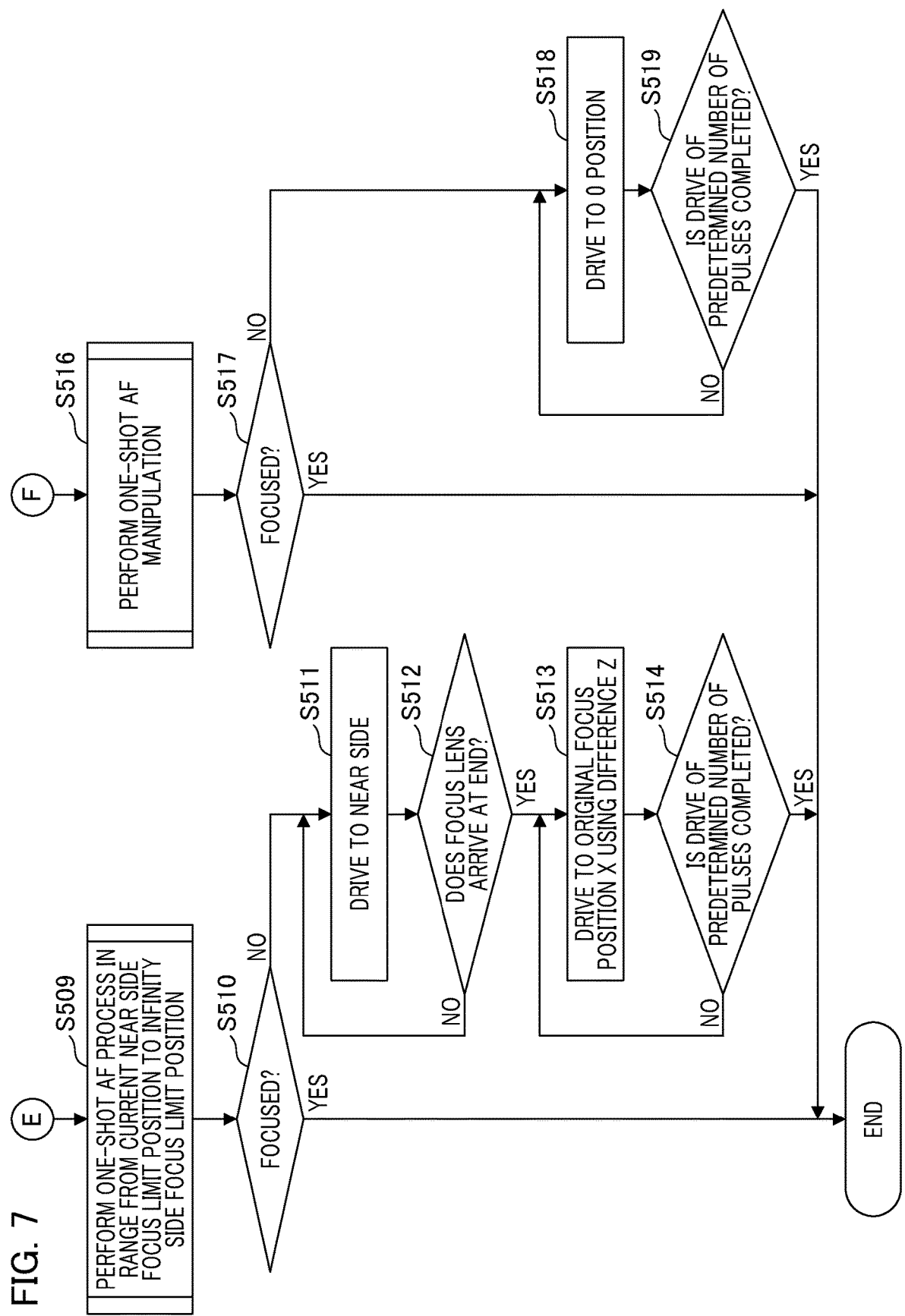
FIG. 7 is a flowchart illustrating the one-shot AF process.

FIGS. 6 and 7 are flowcharts illustrating a one-shot AF process. Actual focus adjustment based on the focus limit positions stored in FIGS. 4 and 5 will be described with reference to the flowcharts. Operations of the flowcharts are realized when the body control unit 119 controls each unit of the video digital camera based on a program stored in the ROM.

When the focus limit is valid in the one-shot AF according to the embodiment, a drive range set through the process of storing the focus limit positions is set as a scan range. When the focus limit is invalid, a range from the near end to a far end of the focus lens is set as a scan range. In FIGS. 6 and 7, a scan operation is assumed to be performed in the entire scan range in the description. However, when a peak of an AF evaluation value is detected, the scan operation may be stopped or the scan operation may be performed only near the peak after the scan operation is performed again once in the entire scan range.

Here, since focus limit control of the related art is the same as that of the lens capable of acquiring the position information regarding the focus lens as the absolute position, the description thereof will be omitted.

In the embodiment, initial values of the focus limit positions are assumed to be the near end and the far end. Therefore, when the focus limit is validly set in a state in which the focus limit positions are not set by the user, the drive range extends from the near end to the far end.

In the first step S501, a manipulation of instructing the one-shot AF is performed as a manipulation by the user.

In step S502, the body control unit 119 determines whether the focus limit is currently in an enabled setting. This corresponds to the determination regarding whether the focus limit is validly set.

When it is determined in step S502 that the focus limit is in the enabled setting, the body control unit 119 acquires third relative position information corresponding to a current focus position X in the next step S503. Here, the third relative position information is information corresponding to a drive amount (in the embodiment, the number of pulses) from a reset position (which is obtained through a reset operation performed in advance) to the current focus position N.

After the acquisition is completed, the body control unit 119 performs a process of driving the focus lens to the near end in the next step S504. In step S505, the body control unit 119 determines whether the focus lens reaches the near end by determining whether the focus lens arrives at an end, and continues the drive process of step S504 until the focus lens reaches the near end.

When it is determined in step S505 that the focus lens arrives at the end, that is, the focus lens reaches the near end, the process proceeds to the next step S506.

In step S506, the body control unit 119 acquires fourth relative position information corresponding to a current focus position Y at the near end. Here, the fourth relative position information is information corresponding to a drive amount (in the embodiment, the number of pulses) from a reset position (which is obtained through a reset operation performed in advance) to the current focus position Y at the near end. A difference Z between the fourth relative position information and the third relative position information corresponding to the original focus position X acquired in step S503 is calculated. The difference Z indicates a relative position of the focus position X to the near end and indicates a drive amount (in the embodiment, the number of pulses) for driving the focus lens from the near end to the focus position X.

In the next step S507, the body control unit 119 drives the focus lens to the near side focus limit position using information regarding the difference L stored in the flowcharts of FIGS. 4 and 5. In step S508, the body control unit 119 detects the number of drive pulses of the focus lens to determine whether the focus lens is driven by a predetermined number of pulses (the number of pulses corresponding to the difference L), that is, the focus lens reaches the near side focus limit position. The drive process of step S507 continues until the focus lens reaches the near side focus limit position.

When it is determined in step S508 that the focus lens is driven by the predetermined number of pulses, that is, the focus lens reaches the near side focus limit position, the process proceeds to the next step S509. In step S509, the body control unit 119 performs the one-shot AF process of the related art to perform focus adjustment within a range from the current near side focus limit position to the far side focus limit position. In the embodiment, the case in which the scan operation is performed from the near side to the far side has been described. However, the scan operation may be performed from the far side to the near side. In this case, the focus lens is driven to the far side limit position in steps S507 and S508. In general, since scenes in which main subjects are present on the near side are numerous, there is the advantage of easily detecting a focus position of a subject on which the scan operation is intended to be performed from the near side to the far side.

Here, a difference between the near side focus limit position and the far side focus limit position can be calculated by obtaining a difference in relative position information (a drive amount which is the number of pulses in the embodiment) from each stored near end. When the focus lens is driven from the near side focus limit position to the far side focus limit position, it is possible to perform handling by driving the focus lens by the predetermined number of pulses based on the difference information. That is, when the near end is set to 0, the focus limit position is set to A, and the far side focus limit position is set to B, a range in which the focus lens moves in the one-shot AF process extends from the position A to the position B. The range in which the focus lens moves is the limit range. The number of drive pulses from the position A to the position B can be obtained by B-A. When the contrast detection scheme is AF, an AF operation can be performed by retrieving whether there is a peak value of an AF evaluation value within the limit range.

In the next step S510, the body control unit 119 determines whether focus was realized in the previous step S509.

When it is determined in step S510 that the focus was realized, the process ends.

When it is determined in step S510 that the focus was not realized, the body control unit 119 performs a process of driving the focus lens to the near end in the next step S511.

In step S512, the body control unit 119 determines whether the focus lens reaches the near end by determining whether the focus lens arrives at an end, and continues the drive process of step S511 until the focus lens reaches the near end.

When it is determined in step S512 that the focus lens arrives at the end, that is, the focus lens reaches the near end, the process proceeds to the next step S513. In the next step S513, the body control unit 119 drives the focus lens from the near end to the original focus position X using information regarding the difference Z, that is, relative position information (a drive amount which is the number of pulses in the embodiment) from the near end.

In step S514, the body control unit 119 detects the number of drive pulses of the focus lens to determine whether the focus lens is driven by a predetermined number of pulses (the number of pulses corresponding to the difference Z), that is, the focus lens reaches the original focus limit position X. The drive process of step S513 continues until the focus lens reaches the original focus limit position X. When it is determined in step S514 that the focus lens is driven by the predetermined number of pulses, that is, the focus lens reaches the original focus position X, the process ends.

When it is determined in step S502 that the focus limit is in the disabled setting (when the focus limit is invalid), the process proceeds to step S515. In the next step S515, the body control unit 119 performs a process (reset operation) of initializing the position information so that the current focus position becomes a 0 position (reset position).

In step S516, the body control unit 119 performs a one-shot AF process of the related art. Here, a range from the near end to the far end of the focus lens is set as a scan range.

In step S517, the body control unit 119 determines whether the focus was realized in the previous step S516. When it is determined in step S517 that the focus was realized, the process ends.

When it determined in step S517 that the focus was not realized, the body control unit 119 performs a process of driving the focus lens to the 0 position set in step S515 in the next step S518. In step S519, the body control unit 119 detects the number of drive pulses of the focus lens to determine whether the focus lens is driven by the predetermined number of pulses, that is, whether the focus lens reaches the 0 position set in step S515. The drive process of step S518 continues until the focus lens reaches the near side focus limit position. When it is determined in step S519 that the focus lens is driven by the predetermined number of pulses, that is, that the focus lens reaches the 0 position which is the original focus position, the process ends.

Here, as the method of returning the focus lens to the original focus position X in steps S513 and S514, the invention is not limited to the method using the difference Z from the near end.

A difference W (the number of pulses) between the difference Z and a focus position V (the number of pulses from the reset position) at the time point of step S511 is calculated without returning the focus lens to the near end in steps S511 and S512. Steps S513 and S514 may be performed using the difference W.

In step S503, the process (reset operation) of initializing the position information is performed so that the current focus position becomes the 0 position (reset position) as in step S515 and the process of step S506 is omitted. The processes from step S511 to step S514 may be substituted with the processes of steps S518 and S519.

In FIGS. 6 and 7, the case in which the limit position (the near side limit position in FIG. 6) at the time at which the scan operation starts is stored as the relative position (the number of pulses) to the near end has been described. When the limit position at the time at which the scan operation starts is stored as the relative position (the number of pulses) to the far end, the focus lens may be driven to the far end in steps S504 and S505.

Since the focus limit control performed using the relative position in the embodiment is specialized for the one-shot AF, the focus limit control may not be applied to the continuous AF. For this reason, when the embodiment is applied to an imaging apparatus capable of using the continuous AF, the following process may be performed. First, it is determined in step S406 whether the focus lens is a lens for which the position information is not acquirable at the absolute position. When it is determined that the focus lens is a lens for which the position information is not acquirable at the absolute position, the continuous AF and the focus limit are prohibited from being used together. The continuous AF and the focus limit control are permitted to be used together only when it is determined that the focus lens is a lens for which the position information is acquirable.

When it is determined that the focus lens is a predetermined kind of lens for which the position information regarding the focus lens is acquirable at the absolute position based on the identification information regarding the mounted interchangeable lens, the control of the focus lens at the relative position is not performed and control of the focus lens at the absolute position is performed. In this case, the focus limit and the continuous AF can be used together. Otherwise, exclusive control is performed.

In the embodiment, the specifications in which the relative position (the number of pulses) from the near end is stored for both of the near side focus limit position and the far side focus limit position have been described. However, specifications in which the relative position (the number of pulses) from the far end is acquired for both of the near side focus limit position and the far side focus limit position may be embodied.

FIGS. 9A to 9C and 10A to 10C are screen transition diagrams illustrating control performed by the digital video camera. A screen transition operation is realized when the body control unit 119 controls each unit of the digital video camera based on a program stored in the ROM.

Figure 9B:
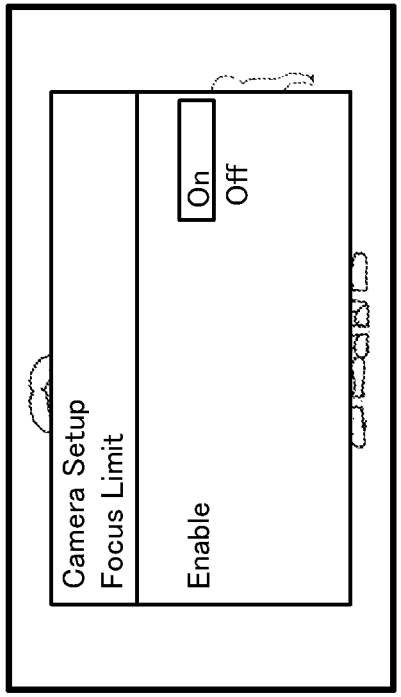
FIGS. 9A to 9C are screen transition diagrams illustrating a focus limit valid/invalid switching manipulation.
Figure 9A:
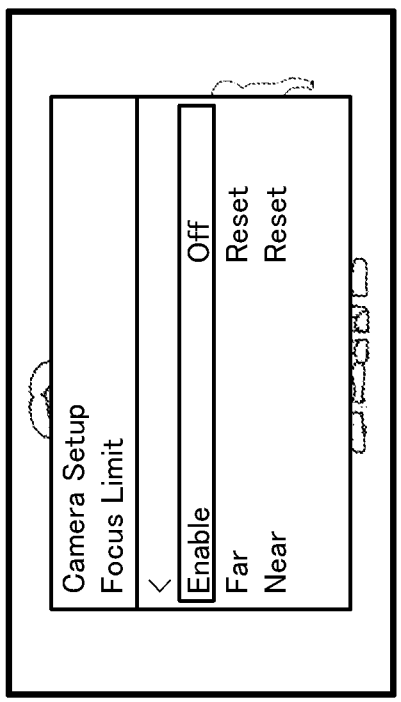
Figure 9C:
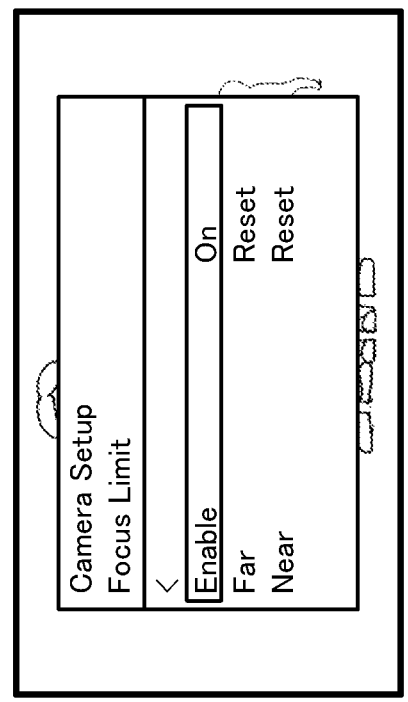

FIGS. 9A to 9C are screen transition diagrams illustrating a focus limit valid/invalid switching manipulation according to the embodiment.

FIG. 9A illustrates a top menu screen for the focus limit valid/invalid switching. Since an Enable field is in a selected state and the focus limit is currently disabled, an Off display is shown on the right side. When the user performs a decision manipulation, the screen transitions to FIG. 9B.

FIG. 9B illustrates a selection screen for the focus limit valid/invalid switching. At this time, when the user performs a decision manipulation of On or Off, the screen transitions to FIG. 9A or 9C.

FIG. 9C illustrates a top menu screen for the focus limit valid/invalid switching when the user performs the decision manipulation of On in FIG. 9B. Since the focus limit is enabled, an On display is shown on the right side.

In the interchangeable lens corresponding to the focus limit, the focus limit valid/invalid switching screen can transition only when the setting is in the AF mode. Accordingly, the focus limit valid/invalid switching screen is not displayed in the MF mode and it is possible to prevent the user from misunderstanding that the focus limit is possible even in the MF mode.

When the setting of the interchangeable lens is switched from the AF mode to the MF mode, the focus limit is turned off (invalidated).

The focus limit enable state may be initialized at the time of subsequent activation after the imaging apparatus is powered off, and then the focus limit may be turned off. The focus limit enable state may remain only when information regarding the mounted interchangeable lens is identified and the interchangeable lens is determined to be the same lens as the lens in which the focus limit is previously set (identification information is matched). In this case, the identification information regarding the interchangeable lens is stored in association with information regarding the focus limit, and the focus limit is controlled using the information regarding the focus limit associated with the identification information regarding the mounted interchangeable lens.

Figure 10A:
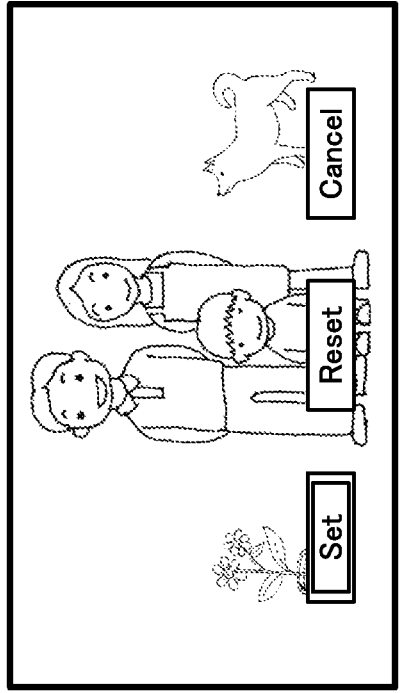
FIGS. 10A to 10C are diagrams illustrating screen transition of a focus limit position setting manipulation.
Figure 10B:
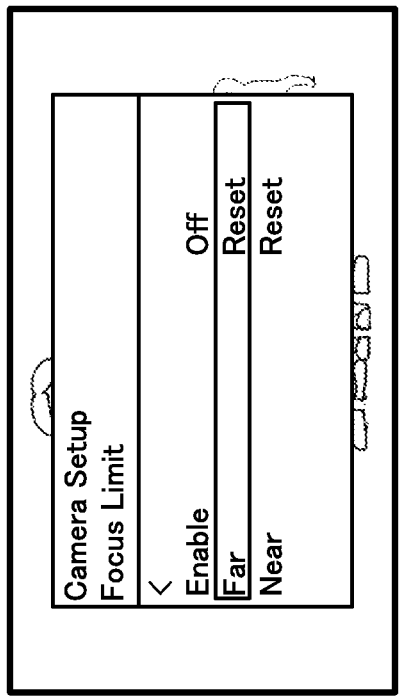
Figure 10C:
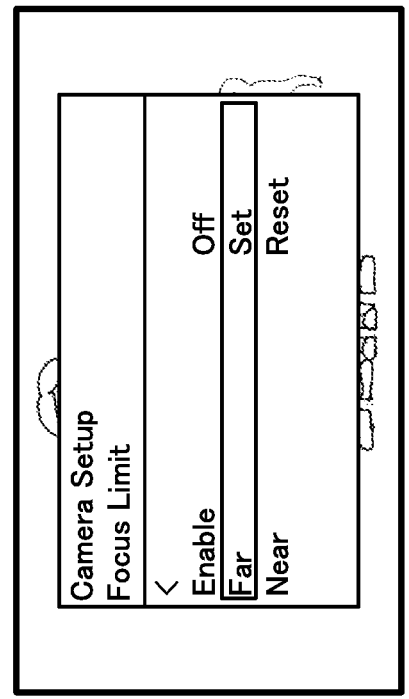

FIGS. 10A to 10C are screen transition diagrams illustrating a focus limit position setting manipulation according to the embodiment.

FIG. 10A illustrates a top menu screen for the focus limit position setting manipulation. At this time, the screen transitions to FIG. 10B when the user performs a decision manipulation. In FIG. 10A, a Far field is in a selected state and the far side focus limit position can be set from this state. Since the far side focus limit position is not currently set, a Reset display is shown on the right side. When the near side focus limit position is set, a Near field may be selected. The far side focus limit position and the near side focus limit position can be individually set, or only one of the far side focus limit position and the near side focus limit position can be set.

FIG. 10B illustrates a selection screen for the focus limit position setting manipulation. At this time, when the user performs a decision manipulation on one of Set, Reset, and Cancel, the screen transitions to FIG. 10A or 10C. The display of FIG. 10B corresponds to a screen display of step S402.

FIG. 10C illustrates a top menu screen for the focus limit position setting manipulation when the user performs a decision manipulation of Set in FIG. 10B. Since the far side focus limit position is currently set, a Set display is shown on the right side.

The display forms of the manipulation screens are not limited to the examples illustrated in FIGS. 9A to 9C and 10A to 10C, but may be appropriately modified.

In the interchangeable lens corresponding to the focus limit, the focus limit position setting manipulation screen can transition only when the setting is in the AF mode. Accordingly, the focus limit position setting manipulation screen is not displayed in the MF mode and it is possible to prevent the user from misunderstanding that the focus limit is possible even in the MF mode.

When the setting of the interchangeable lens is switched from the AF mode to the MF mode, the focus limit is turned off.

The focus limit position information may be initialized at the time of subsequent activation after the imaging apparatus is powered off. The focus limit position information may be applied without change only when the information regarding the mounted interchangeable lens is identified and the interchangeable lens is determined to be the same lens as the lens in which the focus limit is previously set.

According to the embodiment, as described above, the relative position (the drive amount which is the number of pulses in the embodiment) from the near end has been stored as the focus limit position. Accordingly, the focus limit control can be performed based on the relative position information. Therefore, even when the position of the focus lens is not acquirable at the absolute position, it is possible to prevent the lens from being controlled at a focus position unintended by the user.

Second Embodiment

In a second embodiment, information regarding relative positions at a near side focus limit position and a far side focus limit position when another mechanical end serves as a standard is stored. Hereinafter, a case in which the near side focus limit position is stored at a relative position (the number of pulses) to the near end and the far side focus limit position is stored at a relative position to the far end and focus limit is performed based on the position information (the number of pulses) will be described. The configuration of an imaging apparatus and screen displays of a focus limit position setting manipulation are the same as those of the first embodiment, and thus the description thereof will be omitted.

Information necessary herein is the maximum number of drive pulses when a focus lens is driven from the near end (the end position on the near side) to the far end (the end position on the far side) of a movable range. When a drive range is calculated in a one-shot AF process, the near side focus limit position is assumed to be present at a relative position of A to the near end and the far side focus limit position is assumed to be present at a relative position of B to the far end. When a relative position of the far end to the near end, that is, the maximum number of drive pulses, is C, a range of the focus limit can be obtained as follows. Here, A is assumed to be the number of pulses from the near end to the near side focus limit position and B is assumed to be the number of pulses from the far end to the far side focus limit position. When the near end is 0, the near side focus limit position is A and the far side focus limit position is (C−B). A range in which the focus lens moves in a one-shot AF process, that is, a limit range, extends from the position A to the position (C−B), and the number of drive pulse from the position A to the position (C−B) can be obtained as (C−B)−A.

Figure 8:
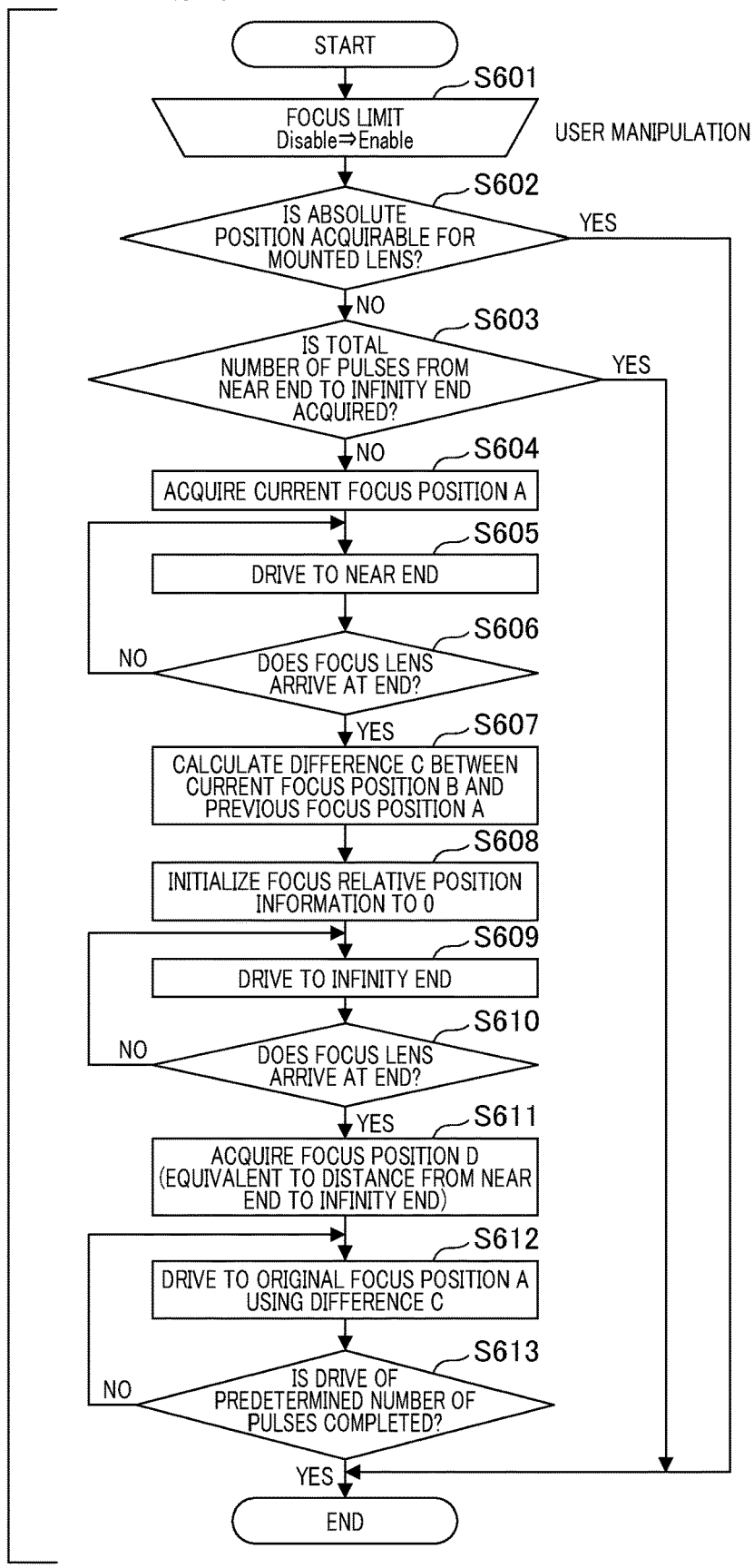
FIG. 8 is a flowchart illustrating a process of storing the number of drive pulses according to a second embodiment.

FIG. 8 is a flowchart illustrating a process of storing the number of drive pulses from the near end to the far end according to the second embodiment. This process is a process performed before the process of storing the focus limit positions is performed. Operations of the flowchart are realized when the body control unit 119 controls each unit of a video digital camera based on a program stored in the ROM.

Here, the number of drive pulses from the near end to the far end is calculated automatically when the user switches the focus limit from Disable to Enable in the description. In the flowchart, a lens interchangeable digital video camera is assumed. As interchangeable lenses, two kinds of lenses for which position information regarding the focus lens can be acquired at an absolute position and can be acquired at only a relative position are assumed to be present in the description.

In the first step S601, a manipulation of switching the focus limit from Disable to Enable is performed as a manipulation by the user.

In the next step S602, the body control unit 119 determines whether the currently mounted interchangeable lens is a lens for which the position information regarding the focus lens is acquirable at the absolute position. The determination method is the same as that of step S406 in FIG. 4.

When it is determined in step S602 that the currently mounted interchangeable lens is a lens for which the position information regarding the focus lens is acquirable at the absolute position, the process ends.

When it is determined in step S602 that the interchangeable lens is the lens for which the position information regarding the focus lens is not acquirable at the absolute position, that is, the lens for which the position information is acquirable at a relative position, the process proceeds to step S603. In step S603, the body control unit 119 determines whether the number of drive pulses from the near end to the far end has already been acquired.

When it is determined in step S603 that the number of drive pulses from the near end to the far end has not been acquired, the body control unit 119 acquires fifth relative position information corresponding to a current focus position A in the next step S604. Here, the fifth relative position information is information corresponding to a drive amount (in the embodiment, the number of drive pulses) from a reset position to the focus position A. After the acquisition is completed, the body control unit 119 performs a process of driving the focus lens to the near end in the next step S605. In step S606, the body control unit 119 determines whether the focus lens reaches the near end by determining whether the focus lens arrives at an end, and continues the drive process of step S605 until the focus lens reaches the near end.

When it is determined in step S606 that the focus lens arrives at the end, that is, the focus lens reaches the near end, the body control unit 119 acquires sixth relative position information corresponding to a focus position B at the current near end in the next step S607. Here, the sixth relative position information is information corresponding to a drive amount (in the embodiment, the number of pulses) from the reset position to the focus position B at the near end. Then, a difference C between the fifth relative position information corresponding to the original focus position A acquired in step S604 and the sixth relative position information is calculated and stored. The difference C indicates a relative position of the focus position A to the near end and indicates a drive amount (in the embodiment, the number of pulses) for driving the focus lens from the near end to the focus position A.

In step S608, the body control unit 119 performs a process of initializing the position information (reset process) so that the current focus position, that is, the near end, is a 0 position (reset position), and subsequently the process proceeds to step S609. In the next step S609, the body control unit 119 performs a process of driving the focus lens to the far end.

In step S610, the body control unit 119 determines whether the focus lens reaches the far end by determining whether the focus lens arrives at an end, and continues the drive process of step S609 until the focus lens reaches the far end.

When it is determined in step S610 that the focus lens arrives at the end, that is, the focus lens reaches the far end, the body control unit 119 acquires and stores the sixth relative position information corresponding to the current focus position D in the next step S611. The sixth relative position information is information (second information) corresponding to the number of drive pulses (maximum number of drive pulses) from the near end to the far end.

In step S612, the body control unit 119 drives the focus lens from the far end to the original focus position A using information regarding the difference C acquired in step S607. Here, the focus lens is currently located at the far end and the difference C is the relative position (the number of pulses) from the near end. Therefore, the number of drive pulses can be obtained by calculating the maximum number of drive pulses D from the near end to the far end—the difference C, and the focus lens can be driven to the original focus position A.

In step S613, the body control unit 119 detects the number of drive pulses of the focus lens, determines whether the focus lens is driven by the predetermined number of pulses, that is, whether the focus lens reaches the original focus position A, and continues the drive process of step S612 until the focus lens reaches the original focus position A. The process ends when it is determined in step S613 that the predetermined number of pulses is driven, that is, that the focus lens reaches the original focus position N.

The process of storing the focus limit positions and the one-shot AF process are the same as those of FIGS. 4 to 7, and thus the detailed description thereof will be omitted herein. As differences from the first embodiment, when the far end focus limit position is stored, the focus lens is driven to the far end in step S408 and the far end focus limit position is acquired as the relative position information (the number of pulses) from the far end. When the one-shot AF process is performed, driving to the near end focus limit position is performed. Subsequently, the drive pulses up to the far end focus limit position are calculated using the difference between the maximum number of drive pulses and the relative position of the far end focus limit position, and a scan operation is performed.

In the embodiment, the near side focus limit position may be stored as the relative position (the number of pulses) to the far end. In this case, the far side focus limit position is assumed to be present at the relative position of A from the near end and the near side focus limit position is assumed to be present at the relative position of B to the far end. When the relative position of the far end to the near end, that is, the maximum number of drive pulses, is C, the range of the focus limit can be obtained as follows. Here, A is assumed to be the number of pulses from the near end to the far side focus limit position and B is assumed to be the number of pulses from the far end to the near side focus limit position. When the near end is 0, the far side focus limit position is A and the near side focus limit position is (C-B). A range in which the focus lens moves in a one-shot AF process, that is, a limit range, extends from the position (C-B) to the position A, and the number of drive pulses from the position (C-B) to the position A can be obtained as A-(C-B).

In the embodiment, as described above, the information regarding relative positions (the number of drive pulses) at the near side focus limit position and the far side focus limit position when another mechanical end serves as a standard is stored. Accordingly, in the embodiment, the focus limit control can also be performed based on the relative position information. Therefore, even when the position of the focus lens is not acquirable at the absolute position, it is possible to prevent the lens from being controlled at a focus position unintended by the user.

Figure 11:
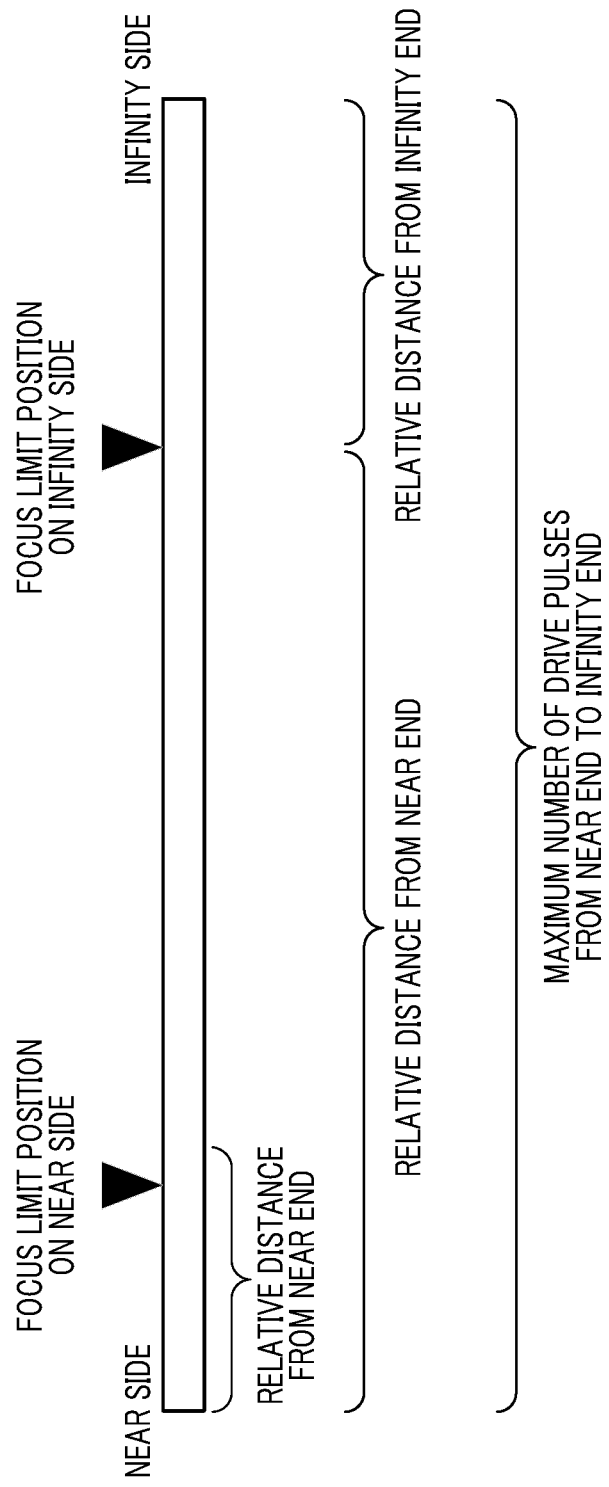
FIG. 11 is an image diagram illustrating relative position information regarding a focus lens.

FIG. 11 is an image diagram illustrating the relative position information regarding the focus lens described above.

Here, when a zoom lens or a variable focus lens (varifocal lens) is used to adjust a focal distance, there is an interchangeable lens in which focal surface movement occurs in accordance with a zoom position (focal distance). On the other hand, there are known correction schemes such as a mechanical correction type in which correction is performed by non-straight movement of a lens group by a cam, an optical correction type in which balance of refractive power is calculated and a focal surface is constantly maintained even in zooming, and an electronic correction type in which correction of focal surface movement is performed by an automatic focus function of a camera side. There is also an interchangeable lens for which a movable range of a focus lens varies in accordance with a zoom position. When the position of a zoom lens is moved relative to the interchangeable lens, a focus limit position may be initialized or the number of drive pulses which is a relative distance from a focus limit position, that is, the near end, may be changed. At this time, since a variable amount is different for each interchangeable lens, it is necessary to store characteristics of each lens in a digital video camera body. Alternatively, for example, focus limit position information (the number of pulses) may be acquired and stored for each of a telephoto side and a wide angle side according to the position of a zoom lens.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-149274, filed Jul. 29, 2015, which is hereby incorporated by reference wherein in its entirety.

What is claimed is:

1. A lens control device performing control of the focus lens, position information of the focus lens is acquirable at a relative position, comprising:
an input member configured to receive designation, from a user, wherein the input member receives the designation of the position of the focus lens in a predetermined mode,
at least one processor programmed to perform the operations of following units:
an acquisition unit configured to acquire first information regarding the focus position in the predetermined mode designated via the input member; and
a control unit configured to control the drive of the focus lens in the predetermined mode based on the first information,
wherein, when the control unit receives the designation via the input member, the control unit starts driving the focus lens from a current focus position to an end position of a movable range of the focus lens, and
wherein the first information is acquired based on information corresponding to a driving amount from a reset position to the current focus position.

2. The lens control device according to claim 1, wherein the control unit drives the focus lens to the end position of the movable range of the focus lens, and then drives the focus lens to the focus position in the predetermined mode based on the first information in the predetermined mode.

3. The lens control device according to claim 1, wherein the information corresponding to the drive amount is information indicating the number of drive pulses of the focus lens.

4. The lens control device according to claim 1, wherein the control unit is able to determine that the focus lens arrives at the focus position.

5. The lens control device according to claim 1, wherein the control unit stores the acquired first information in a storage unit, and wherein, in the predetermined mode, the control unit controls drive of the focus lens based on the first information stored in the storage unit.

6. The lens control device according to claim 5, wherein, when the lens control device is turned off and is activated again, the control unit resets the first information stored in the storage unit.

7. The lens control device according to claim 5, wherein, when a focal distance is changed, the control unit resets the first information stored in the storage unit.

8. The lens control device according to claim 1, wherein the first information is set as a different value according to a change in the focal distance.

9. The lens control device according to claim 1, wherein, when the lens device is able to acquire the position of the focus lens as the absolute position, the acquisition unit acquires the focus position in the predetermined mode designated via the input member as information regarding the absolute position.

10. The lens control device according to claim 1, wherein the control unit stores identification information regarding the lens device in association with the first information in the storage unit.

11. The lens control device according to claim 10, wherein, when identification information regarding the mounted lens device corresponds to the identification information associated with the first information stored in the storage unit, the control unit controls drive of the focus lens in the predetermined mode using the first information.

12. The lens control device according to claim 10, wherein, when the imaging apparatus is turned off in a valid state of the predetermined mode and is activated again, the control unit validates the predetermined mode in a case in which the identification information regarding the mounted lens device corresponds to the identification information associated with the first information stored in the storage unit, and the control unit invalidates the predetermined mode in a case in which the identification information does not correspond to the identification information associated with the first information stored in the storage unit.

13. A lens control method for performing control of the focus lens, position information of the focus lens is acquirable at a relative position, comprising:
receiving designation, from a user, via an input member, wherein receiving the designation from the user includes an operation of receiving the designation of a position of the focus lens in a predetermined mode;
driving of the focus lens is started from a current focus position toward an end position in a movable range of the focus lens, when the user designation is received;
acquiring information corresponding to a drive amount during the drive as first information regarding the focus position in the predetermined mode designated via the input member; and
controlling the drive of the focus lens in the predetermined mode based on the first information, wherein the first information is acquired based on information corresponding to a driving amount from a reset position to the current focus position.

14. A non-transitory computer-readable recording medium storing a program for causing a computer to execute each step in a lens control method for performing control of the focus lens, position information of the focus lens is acquirable at a relative position, comprising:
receiving designation, from a user, via an input member, wherein receiving the designation from the user includes an operation of receiving the designation of a position of the focus lens in a predetermined mode;
driving of the focus lens is started from a current focus position toward an end position in a movable range of the focus lens, when the user designation is received;
acquiring information corresponding to a drive amount during the drive as first information regarding the focus position in the predetermined mode designated via the input member; and
controlling the drive of the focus lens in the predetermined mode based on the first information, wherein the first information is acquired based on information corresponding to a driving amount from a reset position to the current focus position.

15. The lens control device according to claim 1, wherein the first information is acquired by obtaining a difference between the information corresponding to the driving amount from the reset position to the current focus position and information corresponding to a driving amount from the reset position to the end position.

* * * * *